United States Patent
Ling et al.

(10) Patent No.: US 8,396,173 B2
(45) Date of Patent: Mar. 12, 2013

(54) I/Q CALIBRATION TECHNIQUES

(75) Inventors: Curtis Ling, Carlsbad, CA (US); Shuang Yu, Irvine, CA (US)

(73) Assignee: Maxlinear, Inc., Carlsbad, CA (US)

( * ) Notice: Subject to any disclaimer, the term of this patent is extended or adjusted under 35 U.S.C. 154(b) by 731 days.

(21) Appl. No.: 12/240,734

(22) Filed: Sep. 29, 2008

(65) Prior Publication Data
US 2009/0088120 A1     Apr. 2, 2009

Related U.S. Application Data

(60) Provisional application No. 60/977,020, filed on Oct. 2, 2007, provisional application No. 60/976,695, filed on Oct. 1, 2007.

(51) Int. Cl.
*H03D 1/00*     (2006.01)
(52) U.S. Cl. .................... 375/343; 455/266
(58) Field of Classification Search .......... 455/266, 455/276.1, 278.1; 375/229, 327, 346, 319
See application file for complete search history.

(56) References Cited

U.S. PATENT DOCUMENTS

| | | | |
|---|---|---|---|
| 4,262,361 A | 4/1981 | Hauer | |
| 4,653,117 A | 3/1987 | Heck et al. | |
| 4,814,715 A | 3/1989 | Kasperkovitz et al. | |
| 5,101,499 A | 3/1992 | Streck et al. | |
| 5,999,802 A | 12/1999 | Aschwanden | |
| 6,166,668 A | 12/2000 | Bautista et al. | |
| 6,240,100 B1 | 5/2001 | Riordan et al. | |
| 6,275,540 B1 | 8/2001 | Barrett, Jr. et al. | |
| 6,282,413 B1 | 8/2001 | Baltus | |
| 6,334,051 B1 | 12/2001 | Tsurumi et al. | |
| 6,356,218 B1 | 3/2002 | Brown et al. | |
| 6,498,929 B1 | 12/2002 | Tsurumi et al. | |
| 6,606,359 B1 | 8/2003 | Nag et al. | |
| 6,868,128 B1 | 3/2005 | Lane | |
| 6,940,916 B1 | 9/2005 | Warner et al. | |
| 6,987,815 B2 * | 1/2006 | Denno | 375/316 |
| 7,146,146 B2 | 12/2006 | Masenten et al. | |
| 7,181,205 B1 | 2/2007 | Scott et al. | |
| 7,532,870 B2 | 5/2009 | Ling | |
| 7,778,613 B2 | 8/2010 | Seendripu et al. | |
| 2002/0151289 A1 | 10/2002 | Rahman et al. | |
| 2002/0160738 A1 | 10/2002 | Allott et al. | |

(Continued)

FOREIGN PATENT DOCUMENTS

EP     431397 A2     6/1991
EP     473373 A2     3/1992

(Continued)

OTHER PUBLICATIONS

Non-Final Office Action for U.S. Appl. No. 12/831,201, mailed on Feb. 3, 2011, 28 pages.

(Continued)

*Primary Examiner* — Duc Nguyen
*Assistant Examiner* — Fatuma Sherif
(74) *Attorney, Agent, or Firm* — Kilpatrick Townsend & Stockton LLP; Ardeshir Tabibi (57) ABSTRACT

A receiver includes a static I/Q calibration block and a correlation/integration block. The static I/Q calibration block is configured to substantially eliminate mismatches between in-phase and quadrature components of a portion of the spectrum having associated I/Q mismatches that are relatively frequency-independent. The correlation/integration block is configured to substantially eliminate mismatches between the in-phase and quadrature components of portions of the spectrum having associated I/Q mismatches that are relatively frequency-dependent in accordance with a pair of signals generated by the static I/C calibration block.

11 Claims, 3 Drawing Sheets

U.S. PATENT DOCUMENTS

| | | |
|---|---|---|
| 2003/0003891 A1 | 1/2003 | Kivekas et al. |
| 2003/0008628 A1 | 1/2003 | Lindell et al. |
| 2003/0071925 A1 | 4/2003 | Kanno et al. |
| 2003/0109276 A1 | 6/2003 | Wilson |
| 2003/0129955 A1 | 7/2003 | Gilmore |
| 2003/0142234 A1 | 7/2003 | Dent |
| 2003/0174641 A1 | 9/2003 | Rahman |
| 2003/0207674 A1 | 11/2003 | Hughes |
| 2004/0038649 A1 | 2/2004 | Lin et al. |
| 2004/0106380 A1 | 6/2004 | Vassiliou et al. |
| 2004/0110482 A1 | 6/2004 | Chung |
| 2004/0137869 A1 | 7/2004 | Kim |
| 2004/0176058 A1 | 9/2004 | Johnson |
| 2005/0008107 A1* | 1/2005 | Brown .................... 375/343 |
| 2005/0069056 A1 | 3/2005 | Willingham |
| 2005/0221781 A1 | 10/2005 | Lin et al. |
| 2005/0239428 A1 | 10/2005 | Seendripu et al. |
| 2005/0248478 A1 | 11/2005 | Ling |
| 2005/0259186 A1 | 11/2005 | Mehr et al. |
| 2006/0025099 A1 | 2/2006 | Jung et al. |
| 2006/0073800 A1 | 4/2006 | Johnson et al. |
| 2006/0078069 A1 | 4/2006 | Seendripu et al. |
| 2006/0083335 A1 | 4/2006 | Seendripu et al. |
| 2006/0223457 A1 | 10/2006 | Rahman |
| 2006/0252399 A1 | 11/2006 | Paulus |
| 2007/0058755 A1 | 3/2007 | Husted |
| 2007/0077908 A1 | 4/2007 | Vorenkamp et al. |
| 2007/0123188 A1 | 5/2007 | Mo et al. |
| 2008/0250460 A1 | 10/2008 | Khoini-Poorfard et al. |
| 2010/0167684 A1 | 7/2010 | Kerth |

FOREIGN PATENT DOCUMENTS

| | | |
|---|---|---|
| EP | 594894 A1 | 5/1994 |
| EP | 840484 A2 | 5/1998 |
| EP | 964557 A1 | 12/1999 |
| EP | 1172928 A2 | 1/2002 |
| EP | 1182775 A2 | 2/2002 |
| EP | 1294151 A1 | 3/2003 |
| EP | 1300956 A1 | 4/2003 |
| GB | 2392566 A | 3/2004 |
| WO | WO 97/06604 A1 | 2/1997 |
| WO | WO 02/29985 A2 | 4/2002 |
| WO | WO 2005/101648 A1 | 10/2005 |
| WO | WO 2005/101671 A2 | 10/2005 |
| WO | WO 2006/044372 A2 | 4/2006 |
| WO | WO 2006/044373 A1 | 4/2006 |
| WO | WO 2006/063358 A1 | 6/2006 |

OTHER PUBLICATIONS

U.S. Appl. No. 11/106,061, filed Apr. 13, 2005, Ling.
U.S. Appl. No. 11/106,055, filed Apr. 13, 2005, Seendripu et al.
U.S. Appl. No. 12/831,201, filed Jul. 6, 2010, Seendripu et al.
U.S. Appl. No. 12/831,225, filed Jul. 6, 2010, Seendripu et al.
Aschwanden, "Direct conversion—how to make it work in TV tuners," IEEE Transactions on Consumer Electronics, Aug. 1996, vol. 42, No. 3, pp. 729-738.
Guo, et al., "A Fully Integrated 90-MHz CMOS Wireless Receiver With On-Chip RF and IF Filters and 79-dB Image Rejection," IEEE Journal of Solid-State Circuits, Aug. 2002, vol. 37, No. 8, pp. 1084-1089.
Lee, et al. "Full-CMOS 2-GHz WCDMA Direct Conversion Transmitter and Receiver," IEEE Journal of Solid-State Circuits, Jan. 2003, vol. 38, No. 1, pp. 43-53.
Van Sinderen, et al., "A 48-860 MHZ Digital Cable Tuner IC With Integrated RF and IF Selectivity," International Solid-State Circuits Conference, 2003 Digest of Technical Papers, Feb. 12, 2003, 10 pages, IEEE.
Weaver, "A Third Method of Generation and Detection of Single-Sideband Signals", Proceedings of the IRE, 1956, vol. 44, No. 12, pp. 1703-1705.
Weldon, "A 1.75-GHz Highly Integrated Narrow-Band CMOS Transmitter With Harmonic-Rejection Mixers," IEEE Journal of Solid-State Circuits, Dec. 2001, vol. 36, No. 12, pp. 2003-2015.
European Communication for Application No. EP05733984.8, dated Sep. 17, 2007, 4 pages.
European Communication for Application No. EP05733984.8, dated Jun. 13, 2008, 5 pages.
European Communication for Application No. EP05733984.8, dated Oct. 27, 2009, 50 pages.
European Communication for Application No. EP05738651.8, mailed on May 16, 2008, 5 pages.
European Communication for Application No. EP05738651.8, dated Sep. 17, 2007, 2 pages.
European Communication for Application No. EP05809078.8, dated Feb. 2, 2008, 3 pages.
European Communication for Application No. EP05809078.8, dated Apr. 17, 2009, 5 pages.
European Communication for Application No. EP05810558.6, dated Dec. 13, 2007, 4 pages.
European Communication for Application No. EP05810558.6, dated Oct. 28, 2008, 4 pages.
International Search Report of Aug. 2, 2005 in International Application No. PCT/US2005/012906, 4 pages.
Written Opinion of Aug. 2, 2005 in International Application No. PCT/US2005/012906, 8 pages.
International Preliminary Report on Patentability of Oct. 26, 2006 in International Application No. PCT/US2005/012906, 10 pages.
International Search Report of the International Searching Authority for Application No. PCT/US2005/012907, dated Oct. 12, 2005, 6 pages.
Written Opinion of the International Searching Authority for Application No. PCT/US2005/012907, Oct. 12, 2005, 10 pages.
International Preliminary Report on Patentability of Oct. 26, 2006 in International Application No. PCT/US2005/012907, 12 pages.
International Search Report of the International Searching Authority for Application No. PCT/US2005036513, mailed on May 19, 2006, 6 pages.
Written Opinion of the International Searching Authority for Application No. PCT/US2005/036513, mailed on May 19, 2006, 8 pages.
International Preliminary Report on Patentability for Application No. PCT/US2005/036513, mailed on Apr. 26, 2007, 10 pages.
International Search Report of the International Searching Authority for Application No. PCT/US2005/036514, mailed on Feb. 7, 2006, 5 pages.
Written Opinion of the International Searching Authority for Application No. PCT/US2005/036514, mailed on Feb. 7, 2006, 8 pages.
International Preliminary Report on Patentability for Application No. PCT/US2005/036514, mailed on Apr. 26, 2007, 10 pages.
Non-Final Office Action for U.S. Appl. No. 11/106,055, mailed on Nov. 21, 2007, 11 pages.
Response to Non-Final Office Action for U.S. Appl. No. 11/106,055, filed Mar. 18, 2008, 18 pages.
Final Office Action for U.S. Appl. No. 11/106,055, mailed on May 7, 2008, 11 pages.
Response to Final Office Action for U.S. Appl. No. 11/106,055, filed Aug. 8, 2008, 19 pages.
Non-Final Office Action for U.S. Appl. No. 11/106,055, mailed on Sep. 30, 2008, 14 pages.
Response to Non-Final Office Action for U.S. Appl. No. 11/106,055, filed Mar. 27, 2009, 17 pages.
Final Office Action for U.S. Appl. No. 11/106,055, mailed on Jun. 4, 2009, 12 pages.
Response to Final Office Action for U.S. Appl. No. 11/106,055, filed Oct. 1, 2009, 20 pages.
Notice of Allowance for U.S. Appl. No. 11/106,055, mailed on Nov. 18, 2009, 6 pages.
Notice of Allowance for U.S. Appl. No. 11/106,055, mailed on Apr. 2, 2010, 12 pages.
Requirement for Restriction/Election for U.S. Appl. No. 11/106,061, mailed on Sep. 27, 2007, 7 pages.
Response to Requirement for Restriction/Election for U.S. Appl. No. 11/106,061, filed Oct. 26, 2007, 17 pages.
Non-Final Office Action for U.S. Appl. No. 11/106,061, mailed on Jan. 7, 2008, 11 pages.
Response to Non-Final Office Action for U.S. Appl. No. 11/106,061, filed May 21, 2008, 14 pages.
Notice of Allowance for U.S. Appl. No. 11/106,061, mailed on Sep. 10, 2008, 10 pages.

Supplemental Notice of Allowance for U.S. Appl. No. 11/106,061, mailed on Sep. 16, 2008, 6 pages.
Notice of Allowance for U.S. Appl. No. 11/106,061, mailed on Dec. 31, 2008, 8 pages.
Non-Final Office Action for U.S. Appl. No. 11/248,643, mailed on Aug. 20, 2008, 15 pages.
Response to Non-Final Office Action for U.S. Appl. No. 11/248,643, filed Feb. 20, 2009, 13 pages.
Response to Final Office Action for U.S. Appl. No. 11/248,643, filed Dec. 1, 2009, 14 pages.
Final Office Action for U.S. Appl. No. 11/248,643, mailed on Jun. 4, 2009, 10 pages.
Non-Final Office Action for U.S. Appl. No. 11/248,643, mailed on Jan. 6, 2010, 12 pages.
Non-Final Office Action for U.S. Appl. No. 11/248,657, mailed on Sep. 5, 2008, 20 pages.
Response to Non-Final Office Action for U.S. Appl. No. 11/248,657, filed Mar. 2, 2009, 15 pages.
Final Office Action for U.S. Appl. No. 11/248,657, mailed on Jun. 24, 2009, 11 pages.
Response to Final Office Action for U.S. Appl. No. 11/248,657, filed Dec. 17, 2009, 18 pages.
Non-Final Office Action for U.S. Appl. No. 11/248,657, mailed on Jan. 6, 2010, 20 pages.
Non-Final Office Action for U.S. Appl. No. 12/831,225, mailed on Dec. 8, 2010, 30 pages.

* cited by examiner

*FIG. 5*

I/Q CALIBRATION TECHNIQUES

CROSS-REFERENCES TO RELATED APPLICATIONS

The present application claims benefit under 35 USC 119 (e) of U.S. provisional application No. 60/976,695, filed Oct. 1, 2007, and U.S. provisional application No. 60/977,020, filed Oct. 2, 2007, both entitled "I/Q Calibration Techniques", the contents of which are incorporated herein by reference in their entirety.

BACKGROUND OF THE INVENTION

In systems with analog or RF complex signal paths, such as direct conversion and low-IF receiver systems, it is necessary to calibrate the system's balance of in-phase (I) and quadrature (Q) amplitude and phase signals. This is important because imbalances generate interference within the received signal by folding the negative frequencies in the complex path onto the desired signal. In a direct conversion receiver, this process causes the signal to fold onto itself, and is a well-known problem. The extent to which the interference from folding is rejected is referred to as sideband rejection.

A number of techniques have been developed to perform static I/Q calibration and to estimate the phase and amplitude imbalance. I/Q imbalance, or mismatch, is conventionally modeled as constant across the communication channel. This approximation is acceptable in narrow-band systems where the mismatch is dominated by RF contributions associated with mismatches occurring in components such as local oscillators (LO) and mixers. Such RF-based mismatches are referred to herein as static I/Q mismatches or static I/Q imbalances because they are treated as constant across the channel frequency.

However, in wideband communications systems there are mismatches that occur in the baseband circuits. Such mismatches make it difficult to achieve sideband rejection of greater than 45 dB across the band. For example, frequency-dependent mismatches in the baseband analog signal path can result in substantial degradation of sideband rejection to the 40 dB level, when 60 dB or better is required for demanding applications such as broadcast analog television applications.

Figure 1:
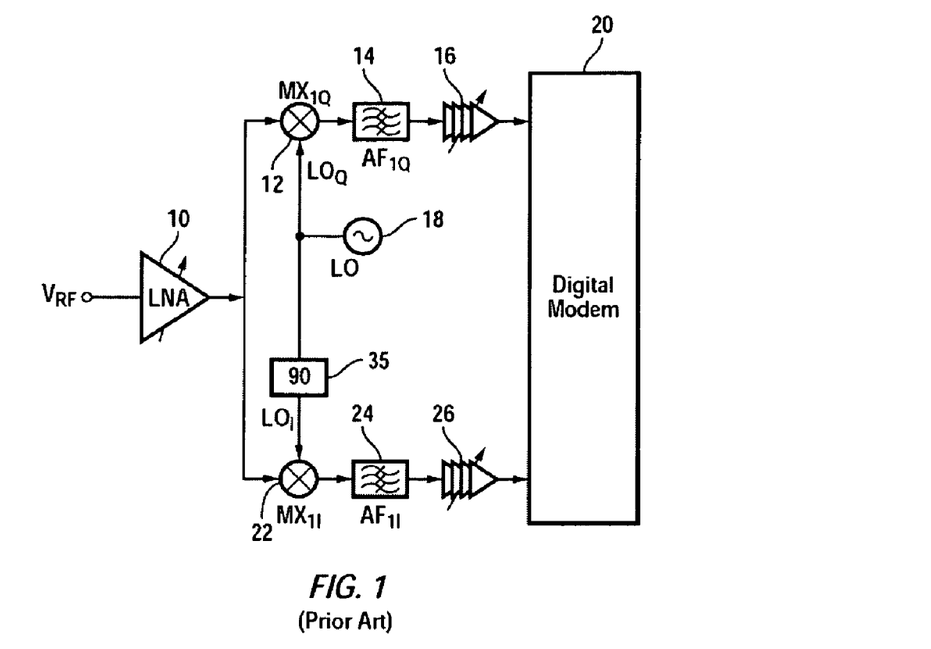
FIG. 1 is a simplified block diagram of a direct conversion receiver, as known in the prior art.

FIG. 1 illustrates a simplified direct conversion receiver, as known in the prior art. I/Q mismatches introduced by LO 18's phase and amplitude differences as well as differences between I-path and Q-path mixers 22 and 12 generally result in static I/Q mismatches. Analog filter 24 disposed in the I-path, and an analog filter 14 disposed in the Q-path are adapted to reduce levels of signal spectrum that are close to the filter passband edges. Such signals often have relatively sharp transition bands, resulting in the presence of poles with high Q-factors. These poles are particularly sensitive to analog component mismatches. The resulting transfer function difference between the analog filters in the I and Q paths creates frequency-dependent mismatches. Such mismatches degrade the sideband rejection performance and continue to increase towards the filter band edge.

BRIEF SUMMARY OF THE INVENTION

A receiver, in accordance with one embodiment of the present invention, includes, in part, a local oscillator; first and second frequency conversion modules, first, second, third and fourth filter, a calibration block, and a correlation/integration block. The first frequency conversion module is responsive to the local oscillator signal and to a received signal to generate an in-phase signal. The second frequency conversion module is responsive to a phase-shifted local oscillator signal and to the received signal to generate a quadrature signal. The first filter is responsive to the in-phase signal, and the second filter is responsive to the quadrature. The third filter is responsive to the first filter, and the fourth filter is responsive to the second analog filter. The calibration block is responsive to the outputs of the third and fourth filters. The correlator/integrator is responsive to the outputs of the calibration block and is adapted to generate a first feedback signal applied to the third filter and a second feedback signal applied to the fourth filter. The first and second feedback signals are operative to vary frequency characteristics of the third and fourth filters so as to compensate for frequency dependent mismatches in the first and second filters. In one embodiment, the third and fourth filters are digital filters.

In one embodiment, the calibration block includes, in part, a first low-pass filter responsive to the third filter, a second low-pass filter responsive to the fourth filter; a phase detection block adapted to detect a difference between phases of the signals generated by the first and second low-pass filters, a first multiplier adapted to multiply the detected phase difference by an output of the third filter, a first signal combiner adapted to subtract an output of the first multiplier from the output of the third filter to generate a first output signal, an amplitude detection block adapted to detect a difference between amplitudes of the signals generated by the first and second low-pass filters, and a second multiplier adapted to multiply the detected amplitude difference by an output of the third filter to generate a second output signal.

In one embodiment, the correlator/integrator block further includes, in part, a first mixer responsive to the first output signal and to a first oscillating signal having an oscillation frequency falling within a frequency band filtered out by the first filter thereby to generate a third signal, a second mixer responsive to the first output signal and to a second oscillating signal having a ninety degrees phase shift with respect to the first oscillating signal thereby to generating a fourth signal, a third mixer responsive to the second output signal and to the first oscillating signal thereby to generate a fifth signal, and a fourth mixer responsive to the oscillating signal thereby to generate a sixth signal. The third and fifth signals define a first complex signal about an offset frequency. The fourth and sixth signal define a second complex signal about the offset frequency. The correlation/integration block is adapted to integrate the first and second complex signals to generate the first and second feedback signals.

A method for performing calibration in a receiver, in accordance with one embodiment of the present invention, includes, in part, frequency converting a received RF signal to a first in-phase signal and a first quadrature signal; filtering the first in-phase signal in an in-phase signal path to generate a second in-phase signal; filtering the first quadrature signal in a quadrature signal path to generate a second quadrature phase signal; performing a first digital filtering operation in response to the second in-phase signal and further in response to a first feedback signal to generate a third in-phase signal; and performing a second digital filtering operation in response to the second quadrature signal and a second feedback signal to generate a third quadrature signal. The first and second feedback signals are adapted to compensate for frequency dependent mismatches in the in-phase and quadrature signal paths.

In one embodiment, the method further includes, in part, detecting a difference between the phases of the second in-phase and quadrature signals; multiplying the detected phase difference by the second in-phase signal to generate a first multiplied signal; subtracting the first multiplied signal from the second quadrature signal to generate a first output signal; detecting a difference between amplitudes of the second in-phase and quadrature signals; and multiplying the detected amplitude difference by the second in-phase signal to generate a second output signal.

In one embodiment, the method further includes, in part, frequency converting the first output signal to a third in-phase signal in response to a first oscillating signal having an oscillation frequency falling within a frequency band used to filter the in-phase signal; frequency converting the first output signal to a fourth in-phase signal in response to a second oscillating signal having ninety degrees phase shift with respect to the first oscillation frequency; frequency converting the second output signal to a third quadrature signal in response to the first oscillating signal; and frequency converting the second output signal to a fourth quadrature signal in response to the second oscillating signal. The third in-phase and third quadrature signals define a first complex signal about an offset frequency. The fourth in-phase and fourth quadrature signals define a second complex signal about the offset frequency. The method further includes, in part, integrating the first and second complex signals to generate the first and second feedback signals.

A method for processing a received signal over wireless communication receiver, in accordance with another embodiment of the present invention, includes, in part, removing mismatches between in-phase and quadrature components of a first portion of a frequency spectrum of the receive signal; and removing mismatches between the in-phase and quadrature components of a second portion of the frequency spectrum of the receive signal. The method further includes, removing the mismatches between the in-phase and quadrature components of the second portion of the frequency spectrum of the receive signal in accordance with a pair of feedback signals generated as a result of removing the mismatches between in-phase and quadrature components of the first portion of a frequency spectrum of the receive signal.

DETAILED DESCRIPTION OF THE INVENTION

Figure 2:
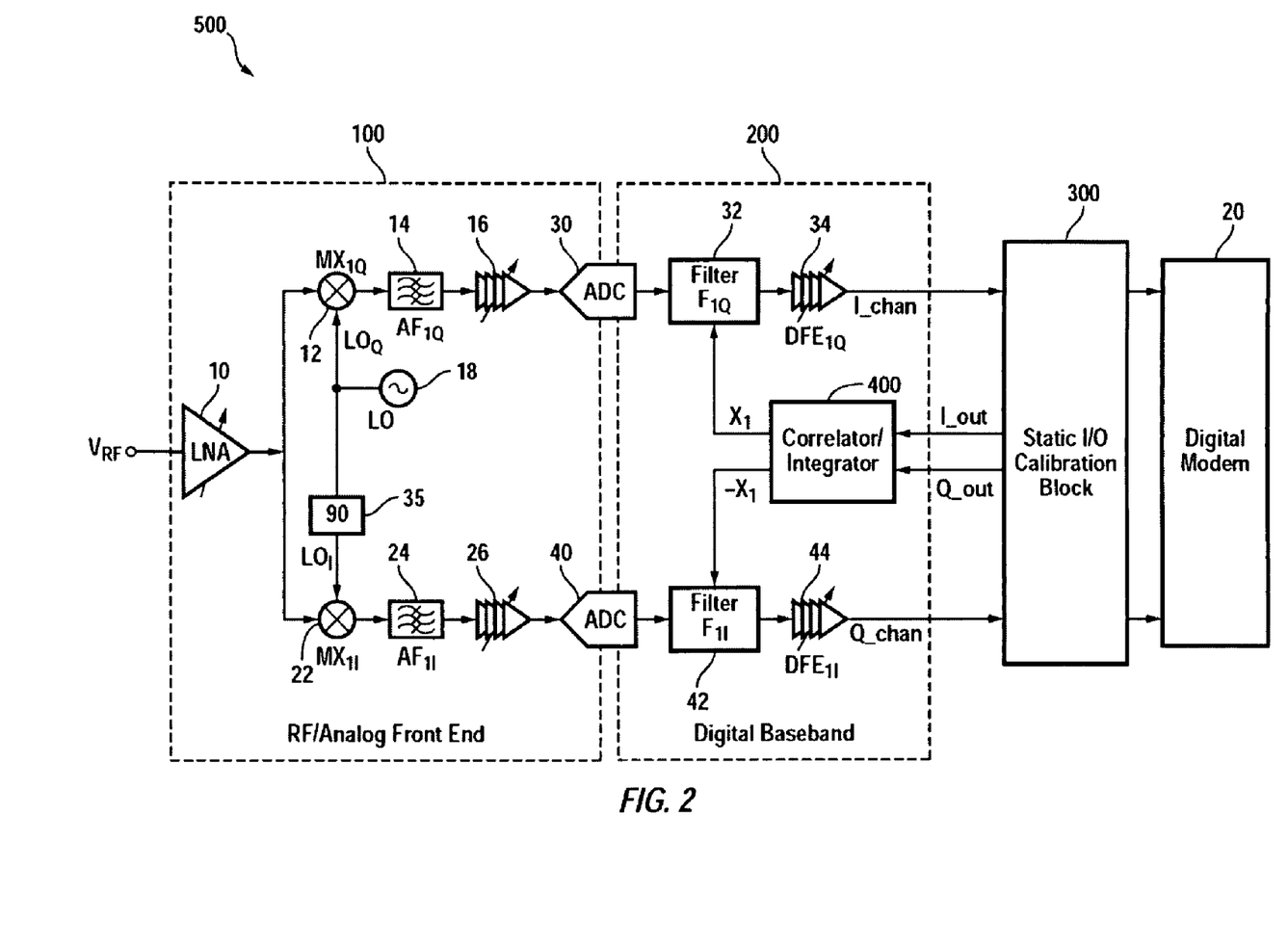
FIG. 2 is a simplified block diagram of a direct conversion receiver, in accordance with one exemplary embodiment of the present invention.

In accordance with one embodiment of the present invention, I/Q mismatches (skews) in a direct conversion receiver is substantially minimized. FIG. 2 is a block diagram of a direct conversion receiver 500 shown as including, in part, an analog front end 100, a digital baseband 200, a static I/Q calibration block 300, and a correlator/integrator 400. The baseband analog I/Q signal path mismatches, such as those from the analog filters 14 and 24, are modeled as a systematic frequency response scaling in the analog signal path transfer function. In other words, mismatches in the analog signal path are treated as being frequency dependent.

Figure 4:
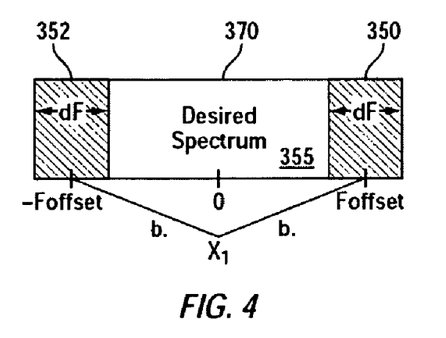
FIG. 4 is a spectrum of a signal received by the static I/Q calibration block of FIG. 3.

FIG. 4 is a spectrum 370 of a signal received by receiver 500. Spectrum 370 is shown as having a first portion 355 associated with I/Q mismatches that are relatively frequency-independent, and second portions 350, 352 associated with I/Q mismatches that are frequency-dependent. Portions 350 and 352 are closer to edges of the bandpass filter and are alternatively referred to hereinbelow as offset portions. As described above, the static I/Q mismatch, corresponding to the mismatch in the spectrum portion 355 of the received signal, e.g., at the outputs of filters 14 and 24, is relatively frequency independent and may be eliminated using any one of a number of conventional techniques. Mismatches in the offset portions 350, and 352 (also shown in FIG. 4 as dF) of the received spectrum are treated as being frequency dependent. As described further below, mismatches in the portion 355 of the spectrum between the I/Q channels is extracted using static I/Q calibration block 300. Mismatches in the offset portions 350, 352 of the spectrum are extracted using correlator/integrator block 400.

To eliminate the I/Q mismatches, the frequency response of digital filter 32 disposed in the I-path is varied to mimic the frequency response of the analog filter 24 disposed in the Q-path, and the frequency response of digital filter 42 disposed in the Q-path is varied to mimic the frequency response of the analog filter 14 disposed in the I-path. The complex spectrum characterizing the opposing portions of the offset, namely spectrum portions 350 and 352, provide an estimate of the I/Q skew introduced by the analog signal path mismatches. The transfer functions of the digital filters 32 and 42 are scaled in a direction opposite to the estimated I/Q skew present in the baseband analog filters in order to yield nearly identical overall transfer functions in I and Q paths, as described further below.

Digital baseband block 200 includes circuitry that calibrates mismatches in wideband applications. As described above, static I/Q calibration block 300 detects mismatches between I-channel and Q channel of the spectrum portion 355. Correlator/integrator 400 detects mismatches in the offset portions 350 and 352 of the received spectrum 470 and, in response, generates signals X1 and X2 (–X1). Signals X1 and X2 respectively adjust the frequency characteristics of digital filters 32 and 42, thereby to cancel the frequency dependent mismatches of analog filters 14 and 24. The result is that mismatches between analog filters 24 and 14 are canceled by nearly equal but opposite mismatches between digital filters 42 and 32, in turn, allowing the cascaded I and Q transfer functions to match across a range of frequencies.

RF amplifier 10 is configured to receive and amplify input signal $V_{RF}$. RF amplifier 10 may be configured to receive a signal, for example, from an antenna or wired connection, such as a single ended wireline, a differential wireline, a twisted pair, a coaxial cable, a transmission line, a waveguide, an optical receiver configured to receive an optical signal over an optical fiber, and the like. In one embodiment, RF amplifier 10 may be a Low Noise Amplifier (LNA). In another embodiment, RF amplifier 10 may be a variable gain amplifier. RF amplifier 10 may be configured as a single-stage or multi-stage amplifier.

The output signal of RF amplifier 10 is shown as being coupled to inputs of first and second frequency conversion modules, 12 and 22. Frequency conversion modules 12 and 22 are shown as being mixers in exemplary embodiment of FIG. 2. Mixers 12 and 22 are configured to generate in-phase (I) and quadrature (Q) frequency down-converted signal components. Mixer 12 is shown as being disposed in the in-phase signal path and mixer 22 is shown as being disposed in the quadrature signal path.

Local oscillator (LO) 18 is configured to generate a local oscillating signal that is applied to mixer 12. Phase shifter 35 shifts the phase of the LO signal by ninety degrees to generate a quadrature LO signal that is applied to mixer 22. The output of mixer 12 is an in-phase signal that is supplied to filter 14. The output signal of filter 12 is amplified by amplifier 16 and subsequently digitized by analog-to-digital converter (ADC) 30. The output of mixer 22 is a quadrature signal that is supplied to filter 24.

The output signal of filter 14 is amplified by amplifier 24 and subsequently digitized by ADC 40. ADCs 30 and 40 respectively apply their output signals to digital filters 32 and 42. The output of digital filter 32 is amplified by variable gain block (stage) 34, and the output of digital filter 42 is amplified by variable gain block 44, as shown.

Figure 3:
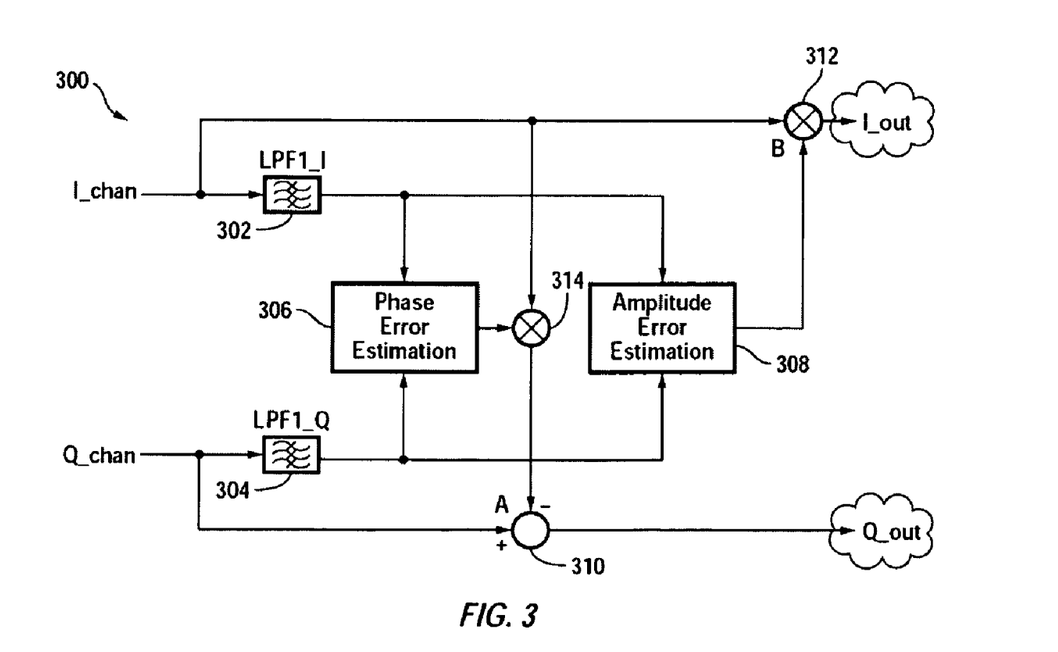
FIG. 3 is a block diagram of the static I/Q calibration block of the direct conversion receiver of FIG. 2, in accordance with one exemplary embodiment of the present invention.

FIG. 3 is a block diagram of static I/Q calibration block 300 of the direct conversion receiver 200, in accordance with one exemplary embodiment of the present invention. As described above, I/Q calibration block 300 is adapted to detect mismatches in the spectrum portion 355 between the In-phase (I) and quadrature (Q) paths (channels) of receiver 500. Referring to FIGS. 3 and 4 concurrently, low-pass filters 302 and 304 filter out portions 350 and 352 of the total received spectrum 370 associated with the I-channel and Q-channel, that are received respectively from variable gain stages 34 and 44.

Phase error estimation block 306 is adapted to detect a difference between the phases of the I/Q signals received from low-pass filters 302, and 304. Amplitude error estimation block 308 is adapted to detect a difference between the amplitudes of the I/Q signals received from low-pass filters 302, and 304. The phase and amplitude error estimation is performed on the spectrum portion 355 having an I/Q mismatch that is frequency independent. Multiplier 314 multiplies the detected phase difference by the signal present on the I-channel to generate a correction signal A. Correction signal A is subtracted from the signal present on the Q-channel to generate a first output signal Q-out. Multiplier 312 multiplies the detected amplitude difference by the signal present on the I-channel to generate signal I-out. Signals I-out and Q-out represent spectrum portion 370 of the received signal after removal of mismatches therefrom, and are applied to correlator/integrator 400, as shown in FIG. 2.

Figure 5:
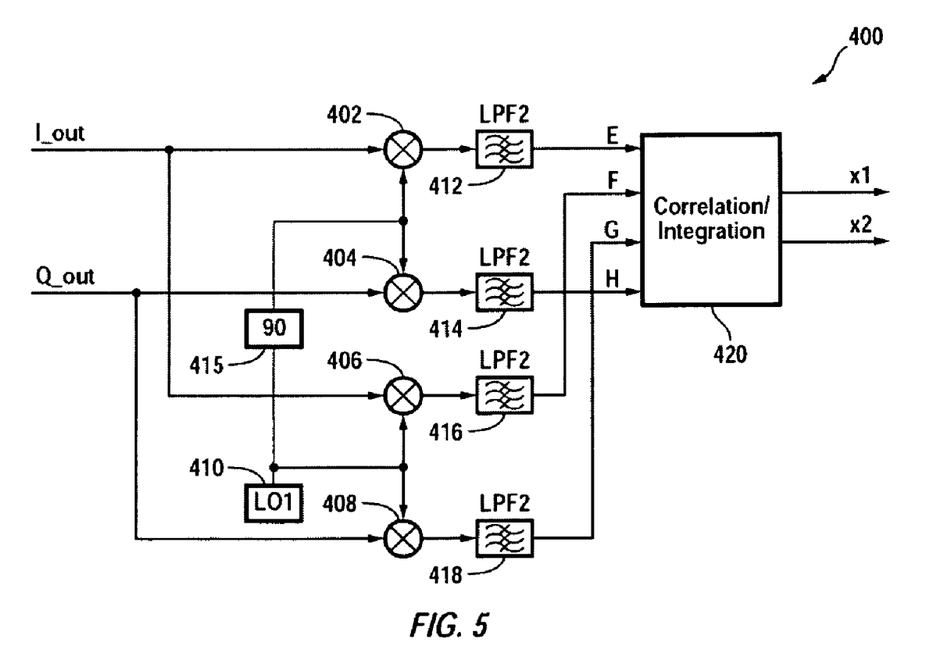
FIG. 5 is a block diagram of the correlation/integration block of the direct conversion receiver of FIG. 2, in accordance with one exemplary embodiment of the present invention.

FIG. 5 is a block diagram of correlator/integrator 400 (hereinafter alternatively referred to as integrator), in accordance with one exemplary embodiment of the present invention. Integrator 400 is adapted to remove mismatches between the in-phase and quadrature components of the offset portions 350, 352 of the frequency spectrum of the receive signal. Integrator 500 is shown as including, in part, a local oscillator (LO) 410 that is tuned to frequency F_offset falling within the offset portions 350 and 352 of the received spectrum.

Signal I_OUT is applied to multipliers (or mixers) 402 and 406. Signal Q_OUT is applied to mixers 404 and 408. Phase shifter 415 generates an oscillating signal that has a 90 degrees phase shift with respect to the output signal of LO 410. The spectrum of the output signals generated by mixers 402, 404, 406, and 408 is centered at DC in one embodiment. Low-pass filters 412, 414, 416 and 418 are adapted to maintain the signal spectrum around ±F_offset by filtering out the known spectrum 355 from the spectrums present at the output of the mixers 402, 404, 406, and 408. Signals E and G represent I-channel and Q-channel signals around frequency (+F_offset), and are collectively referred to as spectrum $b_+$. Signals F and H represent I-channel and Q-channel signals around frequency (−F_offset), and are collectively referred to as spectrum $b_-$. Integration/correlation block 420 correlates spectrums $b_+$ and $b_-$ to generate signals X1 and X2 (−X1), as described further below. Signals X1 and X2 are applied to digital filters 32 and 34, respectively, as shown in FIG. 5.

Referring to FIG. 2, the baseband analog signal path transfer functions associated with analog filters 14 and 24 may be represented as shown below:

$$H_{aI}(\omega)=H_a(\alpha_I \omega) \quad (1)$$

$$H_{aQ}(\omega)=H_a(\alpha_Q \omega) \quad (2)$$

where $\alpha_I$ and $\alpha_Q$ are ideally unity, but in practice are not equal to one another due to various mismatches between the components disposed in RF/analog front end 100. $H_a$ represents the ideal analog signal path transfer function. In some embodiments, automatic calibration restricts the range of deviation of $\alpha_I$ and $\alpha_Q$ so that on average they deviate by, for example, less than 1% from unity.

Portions 350 and 352 of spectrum 370, shown in FIG. 4, are correlated and integrated by correlator/integrator 400, to generate a value $X_1$, as shown below:

$$X_1 = \int b_+(t) \cdot b_-^*(t) dt \quad (3)$$

where $b_+(t)$ and $b_-(t)$ represent time domain transformation of signal spectrums $b_+$ and $b_-$ described above, and notation * represents the convolution operation. Correlator/integrator 400 is well known. The width dF of the spectral slices 350 and 352 on either end of the spectrum can be adjusted to optimize performance of a particular system. In the digital domain, the baseband analog signal path transfer functions are replicated using digital filters 32 and 42, which have the following transfer functions:

$$H_{dI}(z^{-1}, X_1) = H_d((1+\beta \cdot X_1) \cdot z^{-1}) \quad (4)$$

$$H_{dQ}(z^{-1}, X_1) = H_d((1+\beta \cdot X_1) \cdot z^{-1}) \quad (5)$$

The frequency responses of digital filters 32 and 42 are scaled with input signals $X_1$ and coefficient β. In some embodiments, this frequency scaling can be implemented in other ways, e.g., using programmable filter taps in the filter.

The feedback circuit disposed between filters 32, 42, static I/Q calibration block 300 and integrator/correlator 400 operates as follows. As $X_1$ increases, the frequency response of filter 32 moves to reduce the correlation while the frequency response of filter 42 moves in the opposite direction, so that $$2\beta \cdot X_1 \cong \alpha_Q - \alpha_I \quad (6)$$

Because deviation of $\alpha_I$ and $\alpha_Q$ from unity is small, the phase and amplitude differences between the I and Q baseband analog signal paths are approximately dependent only on the difference between $\alpha_I$ and $\alpha_Q$ and only weakly dependent on their absolute values.

The above embodiments of the present invention are illustrative and not limiting. Various alternatives and equivalents are possible. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:
1. A receiver comprising:
a local oscillator;

a first frequency conversion module responsive to the local oscillator and a received signal to generate an in-phase I signal;

a second frequency conversion module responsive to the local oscillator and the received signal to generate a quadrature Q signal;

a first filter responsive to the first frequency conversion module and adapted to generate a first output signal having first and second portions of a frequency spectrum;

a second filter responsive to the second frequency conversion module and adapted to generate a second output signal having the first and second portions of the frequency spectrum;

a third filter responsive to the first filter;

a fourth filter responsive to the second filter;

a calibration block responsive to outputs of the third and fourth filters and adapted to detect mismatches associated with the first portion of the frequency spectrum; and a correlator/integrator responsive to the calibration block and adapted to generate a first feedback signal applied to the third filter and a second feedback signal applied to the fourth filter, said first and second feedback signals being operative to vary frequency characteristics of the third and fourth filters so as to compensate for mismatches associated with the second portion of the frequency spectrum in the first and second filters.

2. The receiver of claim 1 wherein said third and fourth filters are digital filters.

3. The receiver of claim 2 wherein said calibration block comprises:

a first low-pass filter responsive to the third filter;

a second low-pass filter responsive to the fourth filter;

a phase detection block adapted to detect a difference between phases of the signals generated by the first and second low-pass filters;

a first multiplier adapted to multiply the detected phase difference by an output of the third filter;

a first signal combiner adapted to subtract an output of the multiplier from an output of the fourth filter to generate a first output signal;

an amplitude detection block adapted to detect a difference between amplitudes of the signals generated by the first and second low-pass filters; and a second multiplier adapted to multiply the detected amplitude difference by an output of the third filter to generate a second output signal.

4. The receiver of claim 3 wherein said correlator/integrator block comprises:

a first mixer responsive to the first output signal and to a first oscillating signal having an oscillation frequency falling within a frequency band filtered out by the first filter so as to generate a third signal;

a second mixer responsive to the first output signal and to a second oscillating signal having a ninety degrees phase shift with respect to the first oscillating signal, said second mixer generating a fourth signal;

a third mixer responsive to the second output signal and to the first oscillating signal, said third mixer generating a fifth signal, said third and fifth signals defining a first complex signal about an offset frequency;

a fourth mixer responsive to the second oscillating signal, said fourth mixer generating a sixth signal; said fourth and sixth signal defining a second complex signal about the offset frequency; and a correlation/integration block adapted to integrate the first and second complex signals to generate the first and second feedback signals.

5. The receiver of claim 4 further comprising:

first, second, third and fourth low-pass filters are respectively responsive to the first, second, third and fourth mixers.

6. A method for performing calibration in a receiver, the method comprising:

frequency converting a received RF signal to a first in-phase signal and a first quadrature signal;

filtering the first in-phase signal in an in-phase signal path to generate a second in-phase signal;

filtering the first quadrature signal in a quadrature signal path to generate a second quadrature phase signal;

performing a first digital filtering operation in response to the second in-phase signal and further in response to a first feedback signal to generate a third in-phase signal;

performing a second digital filtering operation in response to the second quadrature signal and a second feedback signal to generate a third quadrature signal;

detecting mismatches in a first portion of a frequency spectrum of the third in-phase and quadrature signals to generate a first output signal and a second output signal; and generating the first feedback signal and the second feedback signal in response to the first and second output signals, the first and second feedback signals compensating for mismatches in a second portion frequency portion in the in-phase and quadrature signal paths.

7. The method of claim 6 wherein detecting mismatches in the first portion of the frequency spectrum comprises:

detecting a difference between phases of the second in-phase and quadrature signals;

multiplying the detected phase difference by the second in-phase signal to generate a first multiplied signal;

subtracting the first multiplied signal from the second quadrature signal to generate the first output signal;

detecting a difference between amplitudes of the second in-phase and quadrature signals; and multiplying the detected amplitude difference by the second in-phase signal to generate the second output signal.

8. The method of claim 7 further comprising:

frequency converting the first output signal to a third in-phase signal in response to a first oscillating signal having an oscillation frequency falling within a frequency band used to filter the in-phase signal;

frequency converting the first output signal to a fourth in-phase signal in response to a second oscillating signal having ninety degrees phase shift with respect to the first oscillation frequency;

frequency converting the second output signal to a third quadrature signal in response to the first oscillating signal, said third in-phase and third quadrature signals defining a first complex signal about an offset frequency;

frequency converting the second output signal to a fourth quadrature signal in response to the second oscillating signal, said fourth in-phase and fourth quadrature signals defining a second complex signal about the offset frequency; and integrating the first and second complex signals to generate the first and second feedback signals.

9. A method for processing a received signal over wireless communication receiver, the method comprising:

detecting mismatches between in-phase and quadrature components of a first portion of a frequency spectrum of the received signal; and removing mismatches between the in-phase and quadrature components of a second portion of the frequency spectrum in response to the detected mismatches;

wherein removing the mismatches of the second portion of the frequency spectrum comprises:

adjusting a first transfer function of at least one of the in-phase components in a first direction and adjusting a second transfer function of at least one of the quadrature components in a second direction opposite of the first direction.

10. The method of claim 9 further comprising:

removing the mismatches between the in-phase and quadrature components of the second portion of the frequency spectrum of the received signal in accordance with a pair of feedback signals generated as a result of detecting the mismatches between in-phase and quadrature components of the first portion of a frequency spectrum of the received signal.

11. The method of claim 9 wherein adjusting the first and second transfer functions comprises:

correlating signals associated with the second portion of the frequency spectrum; and integrating the correlated signals to generate control signals for the at least one of the in-phase components and for at least one of the quadrature components.

* * * * *